United States Patent
Yoon (10) Patent No.: US 11,740,184 B2
(45) Date of Patent: Aug. 29, 2023

(54) FIBER WEB FOR GAS SENSOR, METHOD FOR MANUFACTURING SAME, AND GAS SENSOR COMPRISING SAME

(71) Applicant: AMOGREENTECH CO., LTD., Gimpo-si (KR)

(72) Inventor: Young Woo Yoon, Cheongju-si (KR)

(73) Assignee: Amogreentech Co., Ltd., Gimpo-si (KR)

( * ) Notice: Subject to any disclaimer, the term of this patent is extended or adjusted under 35 U.S.C. 154(b) by 87 days.

(21) Appl. No.: 16/480,759

(22) PCT Filed: Jan. 26, 2018

(86) PCT No.: PCT/KR2018/001187
§ 371 (c)(1),
(2) Date: Jul. 25, 2019

(87) PCT Pub. No.: WO2018/139899
PCT Pub. Date: Aug. 2, 2018

(65) Prior Publication Data
US 2019/0391082 A1 Dec. 26, 2019

(30) Foreign Application Priority Data
Jan. 26, 2017 (KR) .................. 10-2017-0012667

(51) Int. Cl.
*G01N 21/78* (2006.01)
*D04H 1/42* (2012.01)
*D04H 1/724* (2012.01)

(52) U.S. Cl.
CPC ............ *G01N 21/783* (2013.01); *D04H 1/42* (2013.01); *D04H 1/724* (2013.01)

(58) Field of Classification Search
CPC .... D04H 1/42; D04H 1/4318; D04H 1/43835; D04H 1/724; D04H 1/728; G01N 21/783; G01N 2021/8427
See application file for complete search history.

(56) References Cited

U.S. PATENT DOCUMENTS

| | | | |
|---|---|---|---|
| 5,529,841 A | 6/1996 | Neihof | |
| 2008/0170982 A1* | 7/2008 | Zhang | D01F 9/1273 423/447.3 |

(Continued)

FOREIGN PATENT DOCUMENTS

| | | |
|---|---|---|
| KR | 20070083673 A | 8/2007 |
| KR | 100990482 B1 | 10/2010 |

(Continued)

OTHER PUBLICATIONS

Aydogdu et al, Optical CO2 Sensing with Ionic Liquid Doped Electrospun Nanofibers, 2010, Journal of Fluorescence, 21, pp. 607-613 (Year: 2010).*

*Primary Examiner* — Elizabeth A Robinson
*Assistant Examiner* — Austin Q Le
(74) *Attorney, Agent, or Firm* — Rothwell, Figg, Ernst & Manbeck, P.C.

(57) ABSTRACT

Provided is a fiber web for a gas sensor. In one exemplary embodiment of the present invention, there is provided a fiber web for a gas sensor including nanofibers including a fiber-forming material and a sensing material for reacting with a target substance in a test gas. According to the exemplary embodiment, the fiber web for a gas sensor is capable of identifying the presence or absence of a target substance in a test gas and quantitatively determining the concentration of a target substance, and exhibits improved sensitivity due to having an increased area of contact and reaction with a target substance contained in a test gas. In addition, the fiber web for a gas sensor facilitates the (Continued)

detection of a target substance in a test gas at a low cost and thus can be widely used for the detection of various volatile organic compounds (VOCs) in households, the diagnosis of asthma or esophagitis or the identification of a patient suffering from the same, and the detection of hazardous materials in other fields of industrial safety.

4 Claims, 7 Drawing Sheets

(56) References Cited

U.S. PATENT DOCUMENTS

| | | | |
|---|---|---|---|
| 2012/0004370 A1* | 1/2012 | Scott | B05B 5/0255 |
| | | | 585/16 |
| 2016/0359184 A1* | 12/2016 | Oh | D04H 1/54 |
| 2017/0261479 A1* | 9/2017 | Kim | G01N 33/0044 |

FOREIGN PATENT DOCUMENTS

| | | | |
|---|---|---|---|
| KR | 101203761 B1 * | 11/2012 | |
| KR | 101203761 B1 | 11/2012 | |
| KR | 20140018752 A | 2/2014 | |
| WO | 2014145745 A1 | 9/2014 | |
| WO | WO-2017155189 A1 * | 9/2017 | G01N 21/783 |

* cited by examiner

| Element | Wt% | At% |
|---|---|---|
| CK | 51.18 | 76.52 |
| OK | 00.86 | 00.96 |
| FK | 21.39 | 20.22 |
| PbM | 26.58 | 02.30 |
| Matrix | Correction | ZAF |

FIBER WEB FOR GAS SENSOR, METHOD FOR MANUFACTURING SAME, AND GAS SENSOR COMPRISING SAME

CROSS REFERENCE TO RELATED APPLICATION

This application is a 35 U.S.C. 371 National Phase Entry Applications from PCT/KR2018/001187, filed Jan. 26, 2018, which claims the benefit of Korean Patent Application No. 10-2017-0012667 filed on Jan. 26, 2017, the disclosures of which are incorporated herein in their entireties by reference.

TECHNICAL FIELD

The present invention relates to a fiber web, more particularly, a fiber web for a gas sensor that can identify the presence or absence of a target substance in a test gas and quantitatively determine the concentration of the target substance and, at the same time, exhibits excellent mechanical strength, and is associated with excellent spinning ability; a method of manufacturing the same; and a gas sensor including the same.

BACKGROUND ART

A conventional gas sensor, which contains a material capable of detecting a target substance contained in a test gas, includes a sensing layer provided either as a coating consisting of the sensing material in a powder form or as a thin film or thick film consisting of the sensing material. A sensing material provided in a powder form or as a thin film or thick film exhibits low reactivity with a target substance that is contained at a low concentration of 1 ppm or less in a test gas, and thus has a limited use in industrial fields requiring high sensitivity and is generally used either for a test gas with a high concentration of a target substance or for applications where a high level of sensitivity to a target substance is not required.

Meanwhile, the detection of a target substance contained at a low concentration requires the use of a semiconductor oxide sensor or an electrochemical sensor either of which, however, is not easily and generally applicable to the entire industrial field considering the life span and price thereof.

Therefore, there is an urgent need to develop a gas sensor which is more competent than conventional high-sensitivity gas sensors at quantifying a target substance in a test gas in a convenient way and detecting a target substance contained at a low concentration in a test gas at a relatively low cost and with high sensitivity.

DISCLOSURE

Technical Problem

The present invention has been made considering the above-described problems, and one aspect of the present invention is directed to providing: a method of manufacturing a fiber web for a gas sensor capable of identifying the presence or absence of a target substance in a test gas and quantitatively determining the concentration of a target substance; and a fiber web for a gas sensor prepared by the method.

Another aspect of the present invention is directed to providing: a method of manufacturing a fiber web for a gas sensor having improved sensitivity due to having an increased area of contact and reaction with a target substance contained in a test gas; and a fiber web for a gas sensor prepared by the method.

Still another aspect of the present invention is directed to providing: a method of manufacturing a fiber web for a gas sensor which, despite containing a material for detecting a target substance, is associated with excellent spinning ability such that the nanofibers in the realized fiber web are uniform in diameter and the aggregation thereof either does not occur or is suppressed to a minimum, provides great ease of handling even without being subjected to a calendering process, exhibits excellent mechanical strength, and, when subjected to an external force, undergoes only a minimal change in the ability to detect a target substance or such a change is prevented; and a fiber web for a gas sensor prepared by the method.

In addition, yet another aspect of the present invention is directed to providing a gas sensor which, by including the above-described fiber web for a gas sensor according to the present invention, facilitates the detection of a target substance in a test gas at a low cost and thus can be applied to the detection of various volatile organic compounds (VOCs) in households, the diagnosis of asthmatic patients, the detection of hazardous gases in other fields of industrial safety, or the like.

Technical Solution

In order to address the above-described problems, there is provided a method of manufacturing a fiber web for a gas sensor, the method including the steps of: (1) preparing a spinning solution containing a fiber-forming material and a sensing material which is in a dispersed state; and (2) preparing a fiber web which includes nanofibers spun from the spinning solution.

According to one embodiment of the present invention, the spinning solution may be prepared by mixing a fiber-forming material or a solution containing a fiber-forming material with a liquid dispersion containing a sensing material.

Here, the liquid dispersion may be prepared by mixing a sensing material with a dispersion medium and heating the mixture such that the sensing material dispersed in the dispersion medium is in a molten state.

In addition, the spinning solution may be a supernatant obtained by subjecting a mixture of a liquid dispersion and a fiber-forming material or a solution containing a fiber-forming material to centrifugation, wherein the liquid dispersion was prepared by heating a mixture of a sensing material and a dispersion medium and thus takes the form of a dispersion in which the sensing material dispersed in the dispersion medium is in a molten state.

Here, the sensing material may include one or more compounds selected from the group consisting of lead acetate, rhodamine, bromocresol green, methyl yellow, Purpald, tetramethylbenzidine, hydroxylamine sulfate, and a hydrate thereof.

Meanwhile, the fiber-forming material may include one or more selected from the group consisting of polyurethane, polystyrene, polyvinyl alcohol, polymethyl methacrylate, polylactic acid, polyethylene oxide, polyvinyl acetate, polyacrylic acid, polycaprolactone, polyacrylonitrile, polyvinylpyrrolidone, polyvinyl chloride, polycarbonate, polyetherimide, polyethersulfone, polybenzimidazole, polyethylene terephthalate, polybutylene terephthalate, and a fluorine-based compound.

In this case, the sensing material may be used in an amount of 10 parts by weight to 20 parts by weight with respect to 100 parts by weight of the fiber-forming material.

In addition, the spinning solution may contain an ionic liquid.

Here, the ionic liquid may be used in an amount of 1 part by weight to 4 parts by weight with respect to 100 parts by weight of the fiber-forming material.

In addition, the fiber-forming material may include a fluorine-based compound and polyvinylpyrrolidone.

In this case, polyvinylpyrrolidone may be used in an amount of 10 parts by weight to 30 parts by weight with respect to 100 parts by weight of the fluorine-based compound.

According to another aspect of the present invention, there is provided a fiber web for a gas sensor, the fiber web including nanofibers including: a fiber portion; and a sensing material provided so as to be some proportion of the sensing material disposed inside of the fiber portion and the other proportion of the sensing material exposed on the nanofiber surface so that it can react with a target substance in a test gas.

According to one embodiment of the present invention, the amount of the sensing material exposed on the nanofiber surface may be 5 parts by weight to 20 parts by weight with respect to 100 parts by weight of the fiber portion.

In addition, the diameter of the nanofibers may range from 150 nm to 1 μm, the thickness of the fiber web may range from 1 μm to 20 μm, and the basis weight of the fiber web may range from 3 $g/cm^2$ to 30 $g/cm^2$.

In addition, the target substance may be hydrogen sulfide, and the sensing material may include at least one of lead acetate and a hydrate thereof.

In addition, the nanofiber may contain an ionic liquid.

In addition, the nanofiber may not include a portion having a diameter of at least 1.5 times the average nanofiber diameter.

In addition, the fiber portion of the nanofiber may include a part that is exposed to the external environment.

According to still another aspect of the present invention, there is provided a gas sensor which includes a fiber web for a gas sensor according to the present invention.

Advantageous Effects

The fiber web for a gas sensor according to the present invention is capable of identifying the presence or absence of a target substance in a test gas and quantitatively determining the concentration of a target substance, and exhibits improved sensitivity due to having an increased area of contact and reaction with a target substance contained in a test gas. In addition, since the preparation method thereof has excellent spinning ability, even when a large amount of nanofibers is spun using a large-scale electrospinning device, the nanofibers in a realized fiber web are uniform in diameter and the aggregation thereof either does not occur or is suppressed to a minimum. Moreover, since the realized nanofibers themselves have excellent mechanical strength, a fiber web composed thereof also has excellent mechanical strength and, when subjected to an external force, undergoes only a minimal change in the ability to detect a target substance or such a change is prevented. Furthermore, the fiber web for a gas sensor according to the present invention facilitates the detection of a target substance in a test gas at a low cost and thus can be applied to the detection of various VOCs in households, the diagnosis of asthmatic patients, the detection of hazardous gases in the field of industrial safety, or the like.

DESCRIPTION OF DRAWINGS

FIGS. 3A and 3B are each a scanning electron microscope (SEM) image of a fiber web for a gas sensor realized according to one exemplary embodiment of the present invention, wherein FIG. 3A shows a 300× magnification of a fiber web containing ball-milled lead acetate as a sensing material and including a 2.3:1 mixture of PVDF and PAN as a fiber-forming material, and FIG. 3B shows a 5 kX magnification of a fiber web containing ball-milled lead acetate as a sensing material and including only PMMA as a fiber-forming material;

FIGS. 7A and 7B illustrate the result of evaluating physical properties of a fiber web of Example 1, wherein FIG. 7A is an SEM image taken at 20 kX magnification, and FIG. 7B shows an SEM image and an energy dispersive spectrometry (EDS) result of the nanofibers marked with a square box in the SEM image;

BEST MODE FOR THE INVENTION

Hereinafter, exemplary embodiments of the present invention will be described in detail with reference to the accompanying drawings so that those skilled in the art can easily carry out the present invention. The present invention may be embodied in many different forms and is not limited to the embodiments described herein. In order to clearly illustrate the present invention, portions or components not related to the description of the present invention are omitted in the drawings, and the same reference numerals are assigned to the same or similar components throughout the specification.

Figure 1:
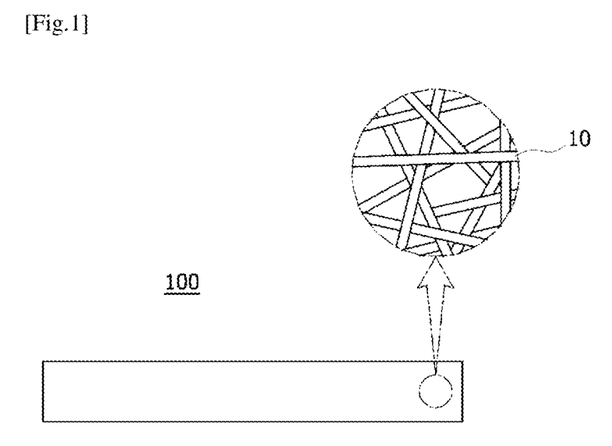
FIG. 1 is a cross-sectional view of a fiber web for a gas sensor according to one exemplary embodiment of the present invention.

Before describing specifically a fiber web 100 for a gas sensor according to the present invention which is illustrated in FIG. 1, a preparation method thereof will be described first. However, it should be noted that although a fiber web for a gas sensor according to the present invention may be prepared by the method to be described below, the method of the present invention is not limited thereto.

The preparation of the fiber web 100 for a gas sensor according to the present invention may include the steps of: (1) preparing a spinning solution containing a fiber-forming material and a sensing material which is in a dispersed state; and (2) preparing a fiber web which includes nanofibers spun from the spinning solution.

Here, the step (1) is a process in which a spinning solution is prepared, wherein the spinning solution consists essentially of a sensing material and a fiber-forming material and may further include a solvent suitably selected considering the types of the fiber-forming material and the sensing material being used. In this case, in order to provide an advantageous effect of remarkably increasing the proportion of the sensing material exposed on the outer surface of the fiber portion of the finally realized nanofibers, the sensing material is in a dispersed state in the spinning solution at the time of its use. When the sensing material is in a dissolved state at the time of its use, a relatively small proportion thereof may be exposed on the outer surface of nanofibers whereas a relatively large proportion thereof is disposed inside of the fiber portion, which may result in a significantly low sensitivity to a target substance in a test gas and a relatively long detection time.

Figure 3A:
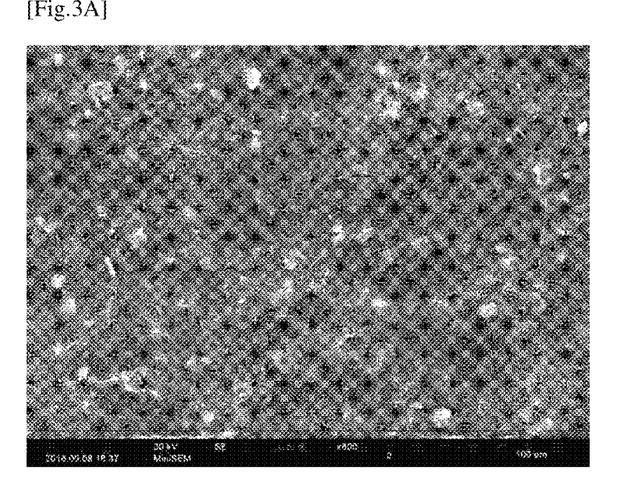
Figure 3B:
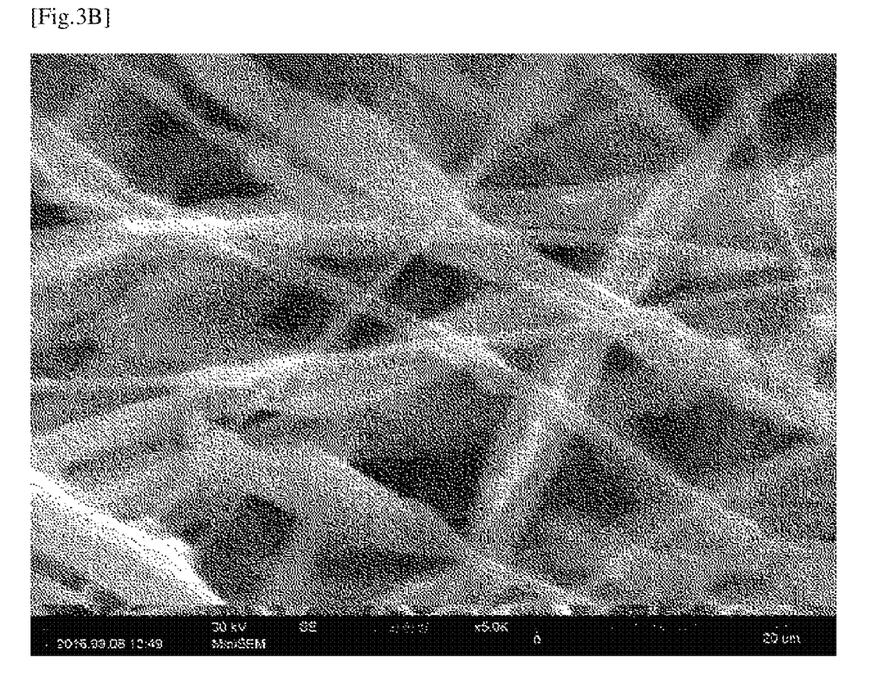

Meanwhile, a spinning solution containing a sensing material in a dispersed state may be realized by mixing a powderized sensing material with a solvent and a fiber-forming material and stirring the mixture, or by mixing a liquid dispersion consisting of a powderized sensing material and a dispersion medium with a fiber-forming material and an additional solvent and stirring the mixture. In this case, for the purpose of preferably improving dispersibility and allowing a larger amount of the sensing material to be exposed per a given area of the outer surface of the fiber portion, the particle size of the sensing material may be further reduced by subjecting the material to ball-milling or the like prior to addition to the spinning solution. However, even with the use of the above-described method, the sensing material is highly likely to agglomerate in the spinning solution, and the precipitation of the agglomerates leads to the inclusion of beads (see FIG. 3A) in the finally realized nanofibers, in which case the beads are sensing material agglomerates that are significantly larger in size than the diameter of the nanofibers. Accordingly, the obtained nanofibers may exhibit relatively low mechanical strength, and the ability to quickly respond to a target material in a test gas, or a desired level of sensitivity, may not be attained. In some cases, the outer surface of the fiber portion may be coated with an excessive amount of the sensing material (see FIG. 3B) to such an extent that the ease of forming a fiber web and the ease of handling the same are lowered.

Therefore, a preferable way of realizing a spinning solution containing a sensing material in a dispersed state is to prepare a liquid dispersion by mixing a sensing material with a dispersion medium and heating the mixture such that the sensing material is in a molten state, mix the liquid dispersion with a fiber-forming material (or with a solution containing a fiber-forming material), and perform stirring. In this case, it is preferable that the temperature of the applied heat is higher than the melting point of the sensing material and, considering the viscosity of the spinning solution, lower than the boiling point of the solvent.

However, even when a spinning solution containing a sensing material dispersed in a molten state is prepared, it may be difficult to prevent the sensing material from being solidified into particles unless temperature is maintained at above the melting point of the sensing material, and in this case, there is a risk that the solid-phase particles cohere to generate larger particles and cause the same problem as in the above-described case in which fibers are spun from a spinning solution containing dispersed sensing material particles. Moreover, the mixing of such a liquid dispersion with a fiber-forming material or a solution containing fiber-forming material to prepare a liquid mixture in the form of a solution may result in a rapid increase in viscosity, and such a high viscosity of the liquid mixture may cause the clogging of a spinning nozzle during spinning such that either nanofibers containing beads are prepared or the liquid mixture is ejected as droplets rather than fibers. The inclusion of beads may lead to a low mechanical strength, and the ejected droplets may come into contact with a portion of prepared fibers and cause the portion to melt, in which case the relevant portion may have a morphology resembling that of a film with no porosity and undesirably block the inflow of a test gas. The low spinning ability may result in a low-quality fiber web that is non-uniform in fiber diameter and includes molten fibers, and may lead to low productivity.

Figure 2:
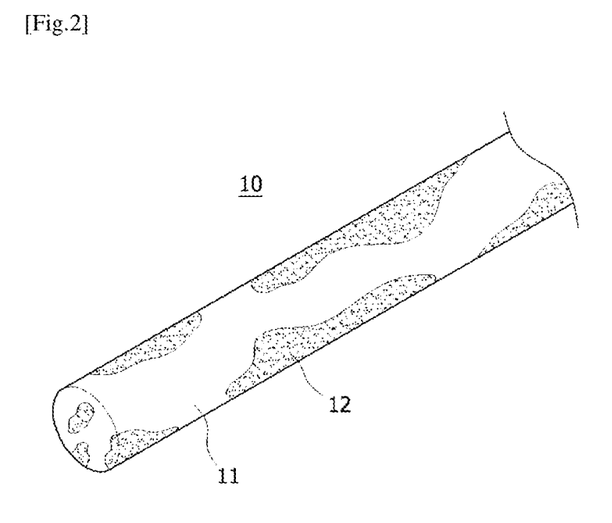
FIG. 2 is a schematic view of a nanofiber including a sensing material, the nanofiber constituting the fiber web of FIG. 1.

Therefore, preferably, the spinning solution is a supernatant obtained by subjecting a mixture of a liquid dispersion and a fiber-forming material or a solution containing a fiber-forming material to centrifugation, wherein the liquid dispersion was prepared by heating a mixture of a sensing material and a dispersion medium and thus takes the form of a dispersion in which the sensing material dispersed in the dispersion medium is in a molten state. In this case, the precipitate may be a slurry of the sensing material and the fiber-forming material which have settled. Since the spinning solution does not contain such a precipitate, an appropriate level of viscosity can be maintained, and even when the temperature of the spinning solution is lowered below the melting point of the sensing material such that the crystallization of the sensing material is induced, the size of the particles produced is very small compared with the case in which centrifugation is not performed, and therefore, the above-described problem occurring when fibers are spun from a spinning solution containing dispersed sensing material particles can be avoided or minimized. Accordingly, rather than being simply embedded as individual particles in the surface of the fiber portion or cohering and being included in the form of beads, the sensing material may be exposed, occupying an area, on the outer surface of the nanofiber as shown in FIG. 2, and therefore, a gas sensor with relatively high sensitivity can be realized. In addition, the fact that the sensing material is neither present only as a coating provided on the outer surface of fiber portion nor embedded as particles may be advantageous to durability.

Meanwhile, although it is illustrated in FIG. 2 that the sensing material 12 is not protruded with respect to the fiber portion 11, it should be noted that the sensing material 12 may actually be provided so as to protrude from the fiber portion 11.

In order to specifically improve the ease of viscosity control of a spinning solution, the spinning solution may be prepared by separately preparing a fiber-forming material solution in which a fiber-forming material and a solvent are mixed and a liquid dispersion in which a sensing material and a dispersion medium are mixed and then mixing them together. In this case, the mixture of the solution and the liquid dispersion may be stirred, for example, at a temperature of 50° C. to 80° C. for one to four hours. Afterward, the stirred mixture may be centrifuged at a rotation speed of 1000 rpm to 4000 rpm for one to five minutes using a conventional centrifuge, and the resulting supernatant may be separated from the precipitate and used as the spinning solution. In this case, the amount of the sensing material to be included in the spinning solution and the size of the sensing material particles can be controlled by the speed and duration of the above-described centrifugation, and may be appropriately changed as desired.

Meanwhile, it is preferable that the spinning solution has a viscosity of 60 cps to 200 cps at 25° C., since it is favorable for ensuring excellent spinning ability, ease of mass production, and quality of a realized product. When the viscosity exceeds 200 cps, remarkably low spinning ability may be attained, which may result in low productivity and the preparation of a low-quality fiber web. The viscosity of less than 60 cps may likewise lead to low spinning ability, and a resulting decrease in the amount of the sensing material contained in fibers may lead to a decrease in sensitivity.

Also, the sensing material may be contained in an amount of 10 parts by weight to 20 parts by weight in the spinning solution with respect to 100 parts by weight of the fiber-forming material. When the sensing material is contained in an amount of less than 10 parts by weight with respect to 100 parts by weight of the fiber-forming material, the prepared nanofibers may contain only a small proportion of the sensing material exposed on the outer surface thereof, and since the exposed sensing material does not occupy a meaningful area on the outer surface of the nanofibers, it may be difficult to realize a gas sensor with high sensitivity. On the other hand, when the sensing material is contained in an amount of more than 20 parts by weight, low spinning ability may be exhibited, and nanofibers with relatively low mechanical strength may be obtained.

Hereinafter, each constituent component of the spinning solution will be described.

The fiber-forming material is a material for constituting the fiber portion 11 to be described below and a main material for forming nanofibers 10. Any polymer compound generally known as being capable of forming a fiber can be used as the fiber-forming material without limitation. For example, the fiber-forming material may include one or more selected from the group consisting of polyurethane, polystyrene, polyvinyl alcohol, polymethyl methacrylate, polylactic acid, polyethylene oxide, polyvinyl acetate, polyacrylic acid, polycaprolactone, polyacrylonitrile, polyvinylpyrrolidone, polyvinyl chloride, polycarbonate, polyetherimide, polyethersulfone, polybenzimidazole, polyethylene terephthalate, polybutylene terephthalate, and a fluorine-based compound. Here, the fluorine-based compound may include one or more compounds selected from the group consisting of a polytetrafluoroethylene (PTFE)-based compound, a tetrafluoroethylene/perfluoroalkyl vinyl ether copolymer (PFA)-based compound, a tetrafluoroethylene/hexafluoropropylene copolymer (FEP)-based compound, a tetrafluoroethylene/hexafluoropropylene/perfluoroalkyl vinyl ether copolymer (EPE)-based compound, a tetrafluoroethylene/ethylene copolymer (ETFE)-based compound, a polychlorotrifluoroethylene (PCTFE)-based compound, a chlorotrifluoroethylene/ethylene copolymer (ECTFE)-based compound, and a polyvinylidene fluoride (PVDF)-based compound. For example, the fiber-forming material may be a fluorine-based compound so that the fiber web 100 for a gas sensor exhibits improved heat resistance, improved chemical resistance, and improved mechanical strength and has improved ease of handling to such an extent that an additional calendering process is not required, and preferably, the fiber-forming material is PVDF. Specifically, in regard to ease of handling, it is common that materials such as PMMA, PAN, and the like, which are commonly used as a nanofiber-forming material, are subjected to a calendering process after spinning in order to remedy the low handleability thereof, in which case, the calendering process is generally performed at a temperature of 70° C. or more. However, when the temperature of the calendering process is similar to the melting point of the sensing material, the heat applied during the calendering process may cause the deformation of the sensing material and thus lead to significantly low sensitivity to a target substance. On the other hand, when the calendering temperature is lowered for the purpose of preventing the occurrence of the above-described problem, virtually no calendering effect is exhibited, and therefore, improvement in handleability cannot be expected. Therefore, when a fluorine-based compound, preferably PVDF, is used as the fiber-forming material, outstanding handleability can be attained even without carrying out a calendering process, and thus the risk of deformation of the sensing material due to a calendering process can be eliminated.

However, when a fluorine-based compound is used as the fiber-forming material and the humidity of a test gas is high, the fiber-forming material may inhibit the reaction between a target substance in the test gas and the sensing material due to a strongly hydrophobic nature thereof, and thus remarkably low sensitivity to the target substance may be exhibited and/or the reaction time may be remarkably extended. As specifically shown in FIGS. 4A and 4B, when a test gas containing 3 ppm of hydrogen sulfide gas as a target substance was flowed into a PVDF-based specimen for a gas sensor at 500 SCCM for one minute while varying only the relative humidity of the test gas, for a test gas of about 23% relative humidity, it can be visually confirmed that a reaction with the hydrogen sulfide material occurred in the specimen (see FIG. 4A), whereas in the case of a test gas of about 66% relative humidity, it can be confirmed that almost no reaction occurred (see FIG. 4B).

Therefore, when a fiber web for a gas sensor in which a fiber-forming material constituting the fiber web consists solely of a fluorine-based compound is used in a humid environment, the fiber web may exhibit low sensitivity to a target substance. Therefore, according to one embodiment of the present invention, the fiber-forming material may include a hydrophilic fiber-forming material as well as a fluorine-based compound. However, even in this case, the hydrophilic fiber-forming material should be provided so as to be exposed on the outer surface of the fiber portion so that it does not adversely affect sensitivity to a target substance in a humid environment, and considering this point, the hydrophilic fiber-forming material may be polyvinylpyrrolidone (PVP). The nanofibers realized by the blending of a fluorine-based compound (specifically PVDF) and PVP, among hydrophilic fiber-forming materials, easily realize a fiber portion having a higher PVP content toward the fiber surface and a higher PVDF content toward the inside of the fibers, i.e., a core-shell-type fiber portion composed of a PVDF core and a PVP shell, and thus are favorable for preventing or minimizing degradation of sensitivity in a humid environment and also advantageous in terms of spinning ability. As specifically shown in FIG. 5A (for a test gas of about 8.5% relative humidity) and 5B (for a test gas of about 66% relative humidity), a fiber web for a gas sensor realized using PVDF and PVP as the fiber-forming material detected a target substance regardless of the humidity of the test gas. Preferably, PVP is used in an amount of 10 parts by weight to 20 parts by weight with respect to 100 parts by weight of the fluorine-based compound so that the surface dissolution and shrinkage of the fiber portion upon exposure to moisture, which may be caused by PVP exposure on the outer surface of the fiber portion, can be prevented. When PVP is used in an amount of less than 10 parts by weight with respect to 100 parts by weight of the fluorine-based compound, the effect of PVP in preventing sensitivity degradation in a high humidity environment may be insignificant, and when PVP is used in an amount of more than 20 parts by weight, the realized fiber web may shrink and may be deformed when exposed to a humid environment, and the dissolution of the sensing material occurring at the surface of the fiber portion may cause the sensing material to be detached or lead to the development of stickiness, among other problems. More preferably, the fluorine-based compound to be mixed with PVP is PVDF so that they can work synergistically to exhibit the effect of achieving the objectives of the present invention.

In addition, according to another exemplary embodiment of the present invention, the spinning solution may further contain an ionic liquid in addition to the above-mentioned fluorine-based compound so that a decrease in sensitivity to a target substance in a humid environment can be prevented. As specifically shown in FIGS. 5A and 5B, the inclusion of an ionic liquid in the spinning solution enabled the detection of a target material even in a test gas having a relative humidity of about 66% (FIG. 6A) or about 83% (FIG. 6B), although the spinning solution included PVDF (i.e., a fluorine-based compound) as the fiber-forming material, and the comparison of this result with the experimental result obtained at a relative humidity of about 66% for a PVDF-based fiber web prepared without using an ionic liquid (FIG. 4B) confirms that the use of an ionic liquid prevented the degradation of detection ability. There is no particular limitation on the type of the ionic liquid as long as it is a generally-known ionic liquid in the art, but trihexyltetradecylphosphonium chloride is preferably used as the ionic liquid. The ionic liquid is preferably used in an amount of 1 part by weight to 4 parts by weight and more preferably used in an amount of 1 part by weight to 3 parts by weight with respect to 100 parts by weight of the fiber-forming material. When the ionic liquid is used in an amount of less than 1 part by weight with respect to 100 parts by weight of the fiber-forming material, the effect of the ionic liquid in preventing sensitivity degradation in a humid environment may be insignificant, and when the ionic liquid is used in an amount of more than 4 parts by weight with respect to 100 parts by weight of the fiber-forming material, the increased use may result in only a slight improvement of the effect of the ionic liquid and rather lead to relatively low spinning ability and the production of a product with relatively low quality.

Next, the sensing material is a material that enables the identification of the presence or absence of a target substance in a test gas by having the ability to react with the target substance, and any material generally known as having such functionality may be used as the sensing material without particular limitation. For example, the sensing material may include one or more compounds selected from the group consisting of lead acetate, rhodamine, bromocresol green, methyl yellow, Purpald®, tetramethylbenzidine, hydroxylamine sulfate, and a hydrate thereof.

The method of detecting a target substance may vary depending on the type of the target substance and the type of a sensing material capable of carrying out the detection. For example, the detection of a target substance may be accomplished by observing a color change of a sensing material resulting from a reaction between the target substance and the sensing material, wherein the amount of the target substance may be quantitatively determined based on the brightness and/or saturation of the color being realized, which increases or decreases depending on the amount of the target substance. In one example of a method based on a color change, the test gas may be the exhalation of a subject, in which case the target substance may be hydrogen sulfide contained in the exhalation, and the sensing material for detecting hydrogen sulfide may be lead acetate and/or a hydrate thereof. Since the reaction between hydrogen sulfide and lead acetate changes the color of the fiber web to yellowish brown or black, it is possible to not only identify the subject as an asthmatic patient but also estimate the degree of progression of asthma based on the brightness and/or saturation of the color being realized. In addition, the use of lead acetate and/or a hydrate thereof as a sensing material for the above-exemplified hydrogen sulfide detection may bring great advantages in the implementation of the above-described step (1) of the present invention.

The melting point of the sensing material may be lower than the melting point of the above-described fiber-forming material. Referring to the description of preparation of a spinning solution, the sensing material is in a molten state at the time of mixing with a fiber-forming material (or with a solution containing a fiber-forming material), and therefore, there is a risk that the fiber-forming material undergoes material deformation if the melting point thereof is lower than the melting point of the sensing material. However, the present invention is not limited thereto.

The sensing material may have a particle size of 100 nm to 400 nm while in a dispersed state in the spinning solution so that the sensing material is not realized as beads on the outer surface of nanofibers but is still exposed on the outer surface of nanofibers as illustrated in FIG. 2, which is favorable for achieving the objectives of the present invention.

Next, a solvent may be further contained in the spinning solution, in which case the selection thereof may be dependent on the type of a fiber-forming material to be used. Examples of such a solvent include water and an organic solvent such as dimethylacetamide (DMAC), provided that the selected solvent is either a poor solvent with respect to the sensing material or capable of dissolving only a very small amount of the sensing material so that the sensing material can maintain the dispersed state. The usage amount of the solvent is not particularly limited in the present invention, but may be varied according to the usage amount of the fiber-forming material and considering the viscosity of the spinning solution.

As described, the above-described sensing material may be in a dispersed state in a liquid dispersion at the time of mixing with a fiber-forming material. In this case, there is no particular limitation on the type of a dispersion medium constituting the liquid dispersion as long as the dispersion medium is a good solvent with respect to the fiber-forming material and a poor solvent with respect to the sensing material, and the dispersion medium may be the same material as the above-described solvent, although it is allowed to select a dispersion medium that is different from the solvent. As with the solvent, the usage amount of the dispersion medium is not particularly limited in the present invention, but may be suitably varied according to the usage amount of the sensing material and considering the viscosity of the spinning solution.

Subsequently in the present invention, the step (2) is carried out to prepare a fiber web including nanofibers spun from the above-described spinning solution.

The method of spinning the spinning solution is not particularly limited in the present invention, but may be suitably selected considering the desired diameter of nanofibers and the type of the fiber-forming material. For example, the method may be an electrospinning method, or an extrusion method in which the spinning solution is pushed through a spinneret. In addition, selection may be made between wet spinning and dry spinning considering the type of the fiber-forming material, the type of the solvent included in the spinning solution, and the like.

Heat and/or pressure may be optionally applied to the nanofibers which have been spun and collected on a collector in order to process them into a fiber web. For example, a calendering process may be performed, and there is no particular limitation on process conditions thereof in the present invention, since details of the process conditions may be suitably adjusted considering the desired thickness and basis weight of a fiber web for a gas sensor to be realized, and the like. However, as described, a conventional calendaring process may cause the deformation of the sensing material and accordingly result in low sensitivity to a target substance when the melting point of the sensing material being used is below the conventional calendering temperature. Therefore, it is preferred that either no calendering process is carried out at all or a calendering process be carried out at a temperature below the melting point of the sensing material.

Since the above-described preparation method according to one exemplary embodiment of the present invention allows the sensing material to be included in the spinning solution without being dissolved therein and to be subsequently discharged along with the fiber-forming material during spinning, excellent spinning ability may be exhibited, and a fiber web realized by the method may exhibit outstanding properties in terms of the sensitivity to a target substance, response speed, mechanical strength, and the maintenance of the ability to detect a target substance to be detected.

Referring to FIGS. 1 and 2, the fiber web 100 for a gas sensor realized by the above-described preparation method includes nanofibers 10, and the nanofiber 10 includes a fiber portion 11 and a sensing material 12 that reacts with a target substance in a test gas.

The fiber web 100 may have a three-dimensional network structure including the nanofibers 10, which is favorable for the securing of a path that allows the inflow of a test gas, and such an increase in specific surface area provides an advantage of increasing an area of contact with a test gas. The advantage of such a fiber web 100 is that it increases the probability that a target substance in a test gas will contact and react with the sensing material 12 even when the target substance is contained at a low concentration in the test gas, and that a high-sensitivity gas sensor is realized.

The fiber web 100 for a gas sensor may have a plurality of pores, and the porosity may range from 30% to 80%. In addition, the fiber web 100 for a gas sensor may have a thickness of 1 µm to 20 µm and a basis weight of 3 g/m$^2$ to 30 g/m$^2$. When the thickness of the fiber web for a gas sensor exceeds 20 µm, a test gas may not easily pass through the fiber web, and therefore, a high-sensitivity gas sensor may not be realized. On the other hand, when the thickness of a fiber web for a gas sensor is less than 1 µm, relatively low mechanical strength may be exhibited, the fiber web may not be easy to prepare and handle, high-sensitivity detection of a target substance may not be easily provided, and color development on the fiber surface may be hindered because a sufficient specific surface area for the color development is not provided. Meanwhile, the suitable thickness of the fiber web 100 for a gas sensor may be satisfied through either a single layer of the fiber web for a gas sensor or a plurality of the fiber webs for a gas sensor arranged in a stack. Here, in stacking a plurality of the fiber webs for a gas sensor, an adhesive material such as a hot-melt powder may be optionally used to bond the individual fiber webs for a gas sensor together.

Meanwhile, when the basis weight of the fiber web 100 for a gas sensor is less than 3 g/m$^2$, relatively low mechanical strength is exhibited, the fiber web for a gas sensor may not be easy to prepare and handle, and color development on the fiber surface may be hindered because a sufficient specific surface area for the color development is not provided. On the other hand, when the basis weight is greater than 30 g/m$^2$, a test gas may not easily pass through the fiber web, and therefore, a high-sensitivity gas sensor may not be realized.

In addition, the nanofiber 10 constituting the fiber web 100 for a gas sensor may have a diameter of 150 nm to 1 µm and preferably 100 nm to 300 nm. When the diameter is less than 150 nm, ease of preparation and handling may be relatively low, and when the diameter is greater than 1 µm, relatively low sensitivity to a target substance may be exhibited due to a relatively low specific surface area.

The fiber web 100 for a gas sensor may be virtually free of a portion in which pores have been closed off or a film has been formed because a drop phenomenon in which droplets rather than fibers are ejected during the spinning of a spinning solution and cause nanofibers to melt, leading to the closing of pores and the formation of a film or membrane rather than a three-dimensional network, does not occur during the preparation thereof.

As illustrated in FIG. 2, the sensing material 12 is provided so as to be exposed on the outer surface of the nanofiber 10, wherein a part thereof may be disposed inside of the fiber portion 11. In this case, the amount of the sensing material 12 exposed on the surface of nanofibers 10 may be 5 parts by weight to 20 parts by weight with respect to 100 parts by weight of the fiber portion 11 so that an improvement in sensitivity to a target substance and response speed can be realized and a desired level of mechanical strength can be secured. The amount of the sensing material 12 exposed on the surface of nanofibers 10 may be measured through EDS. When the amount of the sensing material exposed on the surface of nanofibers is less than 5 parts by weight with respect to 100 parts by weight of the fiber portion, a desired level of sensitivity to a target substance and a desired response speed may not be attained, and when the amount thereof is greater than 20 parts by weight with respect to 100 parts by weight of the fiber portion, relatively low mechanical strength may be exhibited due to the presence of the sensing material in the form of beads on the surface of nanofibers.

In addition, the sensing material 12 may not be present as agglomerates in nanofibers, and accordingly, the nanofibers 10 may not include a portion having a diameter of at least 1.5 times the average diameter of the nanofibers 10. When a nanofiber 10 includes a portion having a diameter of at least 1.5 times the average diameter, such a portion may have been formed due to a sensing material agglomerate and thus may be associated with the relatively low fiber forming ability of the spinning process and result in nanofibers with relatively low mechanical strength. In this case, whether or not the nanofibers include a portion having a diameter of at least 1.5 times the average diameter is determined based on SEM images taken at three different points in an obtained fiber web at 20 kX magnification.

It has been described above that the fiber portion of the nanofibers may include a part that is exposed to the external environment. When the nanofibers have been realized such that virtually the entire outer surface of the fiber portion thereof is coated with the sensing material, even when the nanofibers do not include a portion having a diameter of at least 1.5 times the average diameter of the nanofibers, it is likely that the sensing material will be easily detached to such an extent that the detection ability is not well maintained and a fiber web with remarkably low handleability is obtained, and when the fiber web is subjected to a calendering process in order to remedy the low handleability thereof, the sensing material may be deformed and thus relatively low detection ability may be exhibited.

In addition, when the fiber web 100 for a gas sensor has been prepared using a spinning solution containing an ionic liquid, the fiber web 100 for a gas sensor may include an ionic liquid. The usage amount of such an ionic liquid and the effects provided by the same have been described above.

In addition, when the fiber web 100 for a gas sensor has been prepared using PVDF and PVP as the fiber-forming material, the content ratio of PVDF and PVP in the obtained fiber web 100 for a gas sensor may be the same as in the spinning solution. The usage amount of PVDF and PVP and the effects provided by the same have been described above.

The fiber web 100 for a gas sensor may be embodied as a gas sensor by further including one or more other members. The other member may be a nonwoven fabric having a porous structure capable of reinforcing the mechanical strength of the fiber web 100 while not inhibiting the inflow of a test gas into the fiber web 100, or it may be an adhesive member for attaching the fiber web 100 to a surface of another object to be adhered or a housing for protecting the outer surface of the fiber web 100. However, the present invention is not limited thereto, and the other member may be any generally-known component of a gas sensor.

Mode of the Invention

Hereinafter, the present invention will be described in more detail with reference to the following exemplary embodiments. However, the following exemplary embodiments should not be construed as limiting the scope of the present invention, but should be construed to facilitate understanding of the present invention.

Example 1

First, a solution containing a fiber-forming material was prepared by dissolving, as the fiber-forming material, 32 g of PVDF (Kynar761 manufactured by Arkema) in 180 g of a DMAC solvent for six hours at 80° C. using a magnetic bar.

Next, a liquid dispersion containing a sensing material was prepared by mixing 60 g of DMAC as a dispersion medium and 96 g of lead acetate trihydrate (manufactured by Sigma-Aldrich, weight-average molecular weight: 379.33) and stirring the mixture using a magnetic bar for one hour at a temperature of 80° C. so that a liquid dispersion in which the lead acetate trihydrate is dispersed in a molten state in the dispersion medium was obtained. Afterward, the liquid dispersion was mixed with the solution containing a fiber-forming material, and the liquid mixture of the liquid dispersion and the solution containing a fiber-forming material was stirred using a magnetic bar for two hours at a temperature of 60° C.

The prepared liquid mixture was centrifuged at 3,000 rpm for five minutes. Subsequently, a slurry of the sensing material and the fiber-forming material which had become the precipitate was removed, and only the supernatant was collected from the centrifuge tube and used as a spinning solution. The spinning solution contained the sensing material in an amount of 18 parts by weight with respect to 100 parts by weight of the fiber-forming material, the viscosity thereof at 25° C. was 140 cps, and the average particle size of the sensing material was 190 nm. Subsequently, the spinning solution was introduced into a solution tank of a large-scale electrospinning apparatus capable of producing a fiber web at a rate of 100 g/m² per hour, and was discharged at a rate of 15 µl/min/hole. At this time, an air pressure of 0.03 MPa was applied to each nozzle of a spinning nozzle pack at the same time as a voltage of 40 kV was applied to the top of the collector and the spinning nozzle pack using a high-voltage generator, and thereby a PVDF-based fiber web for a gas sensor as shown in Table 1 was obtained. In this case, the temperature and humidity of the spinning section were maintained at 28° C. and 40%, respectively, and the distance between the collector and a spinning nozzle tip was set to 18 cm. The obtained fiber web had a basis weight of 30 g/m², an average nanofiber diameter of 200 nm, and a porosity of 60%, and included, on the surface of the nanofibers, the sensing material in an amount of about 16.8 parts by weight with respect to 100 parts by weight of the fiber portion. In this case, none of the nanofibers included a portion having a diameter of at least 1.5 times the average nanofiber diameter.

Example 2

A fiber web for a gas sensor as shown in Table 1 was prepared in the same manner as in Example 1 except that the above-described liquid mixture was not subjected to centrifugation and was used as a spinning solution as is.

The obtained fiber web had a basis weight of 30 g/m², an average nanofiber diameter of 250 nm, and a porosity of 65%, and some of the nanofibers included a portion having a diameter of greater than 1.5 times the average nanofiber diameter.

Example 3

A fiber web for a gas sensor as shown in Table 1 was prepared in the same manner as in Example 1 except that a spinning solution was prepared by mixing lead acetate trihydrate pulverized by dry ball-milling, instead of the above-described liquid dispersion, with the above-described solution containing a fiber-forming material in such an amount that the same content ratio as in the spinning solution of Example 1 was attained, and then stirring the mixture using a magnetic bar for two hours at 25° C.

The obtained fiber web had a basis weight of 20 g/m², an average nanofiber diameter of 400 nm, a porosity of 43%, and some of the nanofibers included a portion having a diameter of greater than 1.5 times the average nanofiber diameter.

COMPARATIVE EXAMPLE

A PVDF fiber web having a basis weight of 28 g/m², an average nanofiber diameter of 186 nm, and a porosity of 64% was prepared in the same manner as in Example 1 except that the above-described solution containing a fiber-forming material of Example 1 was used as a spinning solution. Subsequently, the fiber web was impregnated with a coating solution prepared as follows and dried for 15 minutes at a temperature of 60° C., and thereby a fiber web for a gas sensor coated with a sensing material as shown in Table 1 was obtained.

Coating Solution

A coating solution was prepared by mixing 200 ml of isopropyl alcohol and 20 g of lead acetate trihydrate pulverized by ball-milling and stirring the mixture for ten minutes at 25° C.

Experimental Example 1

Figure 7A:
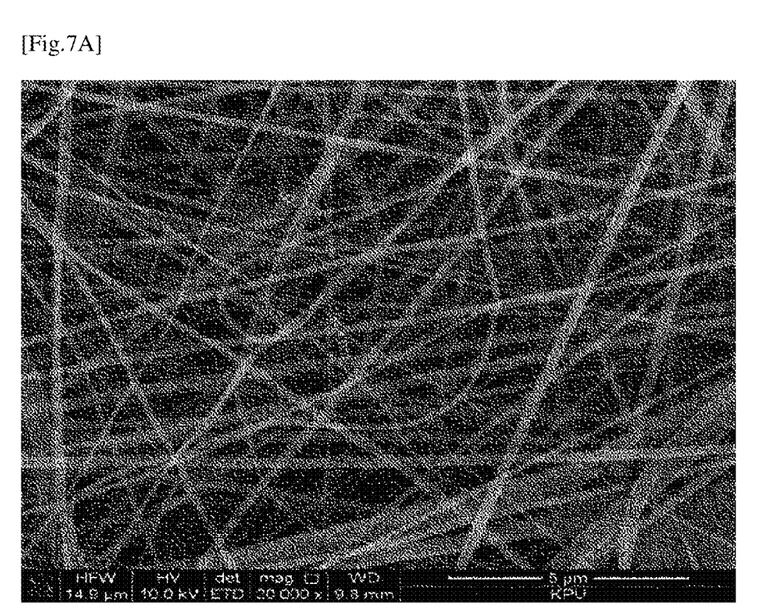
Figure 7B:
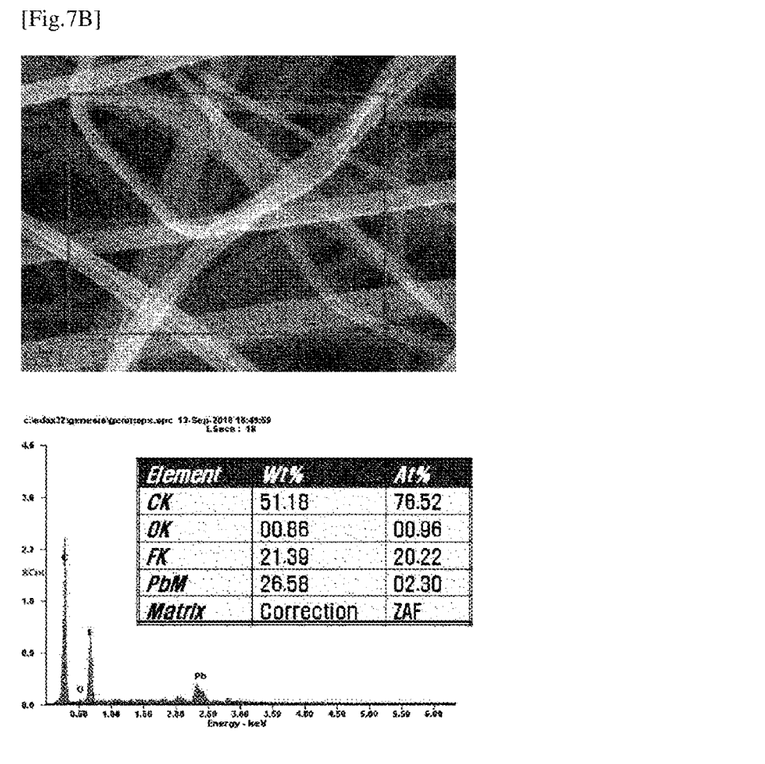
Figure 8:
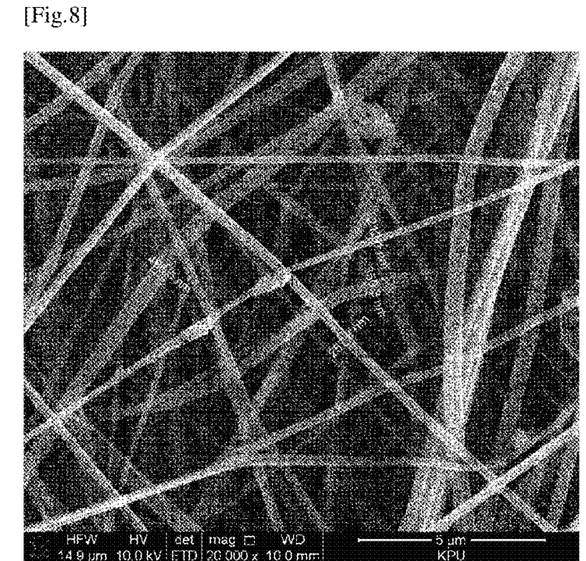
FIG. 8 is an SEM image of a fiber web of Example 2.
Figure 9A:
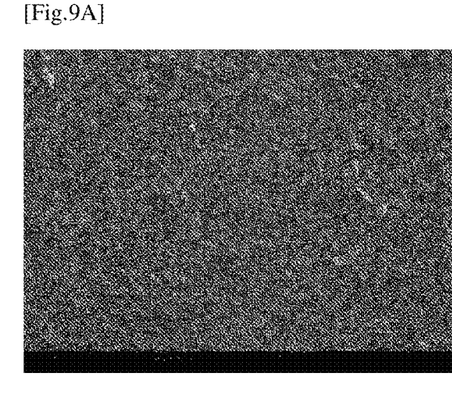
FIGS. 9A and 9B are SEM images of a fiber web of Example 3, taken at different magnifications (300× for FIG. 9A, and 3 kX for FIG. 9B)
Figure 9B:
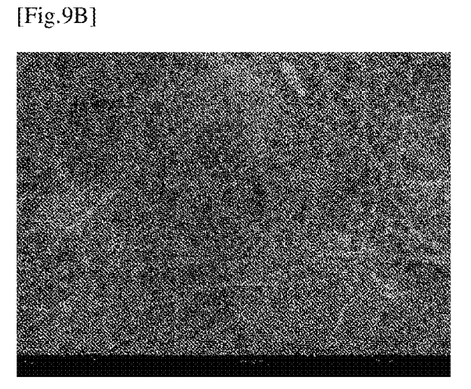

SEM images were taken of the fiber webs for a gas sensor prepared according to Examples 1 to 3 (FIGS. 7A and 7B for Example 1, FIG. 8 for Example 2, FIGS. 9A and 9B for Example 3).

As specifically shown in FIGS. 7A and 7B, the fiber web of Example 1 was prepared such that the sensing material was exposed on the surface of nanofibers but not present as agglomerates appearing in the form of beads. In addition, the fact that the realized nanofibers were highly uniform in diameter and no closing of pores was found indicated outstanding spinning ability. In particular, since the fiber web of Example 1 included a sensing material that was different from the fiber-forming material, it had a very high level of uniformity in diameter which indicates excellent spinning ability, although it was mass-produced using a large-scale electrospinning apparatus rather than being produced at the laboratory level.

In addition, FIG. 8 shows that in the fiber web of Example 2, some of the nanofibers included beads of the sensing material exposed on the surface thereof, which indicates relatively low spinning ability of Example 2 compared to Example 1.

On the other hand, FIGS. 9A and 9B show that the fiber web of Example 3 included closed pores in some areas and contained a number of beads although the preparation thereof involved a ball-milling process, and this indicates the significantly low spinning ability of Example 3 compared to Examples 1 and 2. In addition, from the above-described results, it can be expected that the fiber web of Example 2 has higher mechanical strength than the fiber web of Example 3, and that the fiber web of Example 1 has higher mechanical strength than the fiber web of Example 2.

Experimental Example 2

Figure 10:
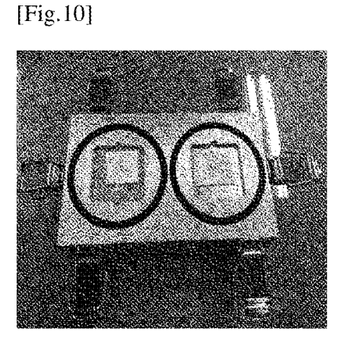
FIG. 10 is a photograph of a production jig used for testing the detection ability with respect to a test gas.

Each of the fiber webs for a gas sensor prepared according to the Examples 1 to 3 and the Comparative Example was evaluated for its ability to detect hydrogen sulfide gas by allowing a test gas containing hydrogen sulfide at a predetermined concentration to flow into the fiber web for a gas sensor at a predetermined flow rate using a production jig (manufactured by Amogreentech) illustrated in FIG. 10. In this case, the used specimens measured 20 mm (width)×20 mm (length).

Specifically, the evaluation involved allowing a test gas having a hydrogen sulfide concentration of 1 ppm and a relative humidity of 23% to flow into each specimen at a flow rate of 500 SCCM at 25° C. and measuring the time in seconds required to change the color of the specimen to black or yellowish brown, and the results thereof are shown in Table 1 below.

Meanwhile, in order to observe a change in mechanical strength and a change in the ability to detect hydrogen sulfide gas according to the change in mechanical strength, each specimen was subjected to a frictional stimulus by being grasped at two opposite corners and rubbed for three seconds, and then the time required for the inflow of a test gas to change the color of the specimen was measured in the same manner as the above-described evaluation method, and the results thereof are shown in Table 1 below.

TABLE 1

|  | Example 1 | Example 2 | Example 3 | Comparative Example |
|---|---|---|---|---|
| Time required for color change, before friction (seconds) | 42 | 47 | 53 | 60 |
| Time required for color change, after friction (seconds) | 55 | 64 | 79 | 89 |

Specifically, as can be seen from Table 1, in the case of the Comparative Example in which the sensing material was provided as a coating, the time required for a color change upon contact with a test gas was significantly long compared to the Examples, and particularly, the time required for a color change after friction was long compared to the Examples. It is considered that this result was attributed to the easy detachment of the sensing material coating due to friction.

The result also shows that among the Examples 1, 2, and 3, the time required for a color change was especially long and the increase in time required for a color change due to friction was especially large in the case of Example 3 in which the spinning solution subjected to spinning contained a sensing material pulverized by ball-milling.

Example 4

A fiber web for a gas sensor as shown in Table 2 was prepared in the same manner as in Example 1 except that a spinning solution containing, as an ionic liquid, trihexyltetradecylphosphonium chloride in an amount of 2.8 parts by weight with respect to 100 parts by weight of the fiber-forming material was used.

Examples 5 to 9

A fiber web for a gas sensor as shown in Table 2 was prepared in the same manner as in Example 4 except that the amount of the ionic liquid included in a spinning solution was varied as shown in Table 2.

Experimental Example 3

The following properties of the fiber webs for a gas sensor prepared according to Examples 1 and 4 to 9 were evaluated.

1. Evaluation of Ability to Detect Hydrogen Sulfide Gas at Various Humidities

The ability of each specimen to detect hydrogen sulfide gas was evaluated by allowing a test gas of varying hydrogen sulfide concentration and varying relative humidity to flow into the specimen at a predetermined flow rate using a production jig (manufactured by Amogreentech) illustrated in FIG. 10. In this case, the used specimens measured 20 mm (width)×20 mm (length).

Figure 4A:
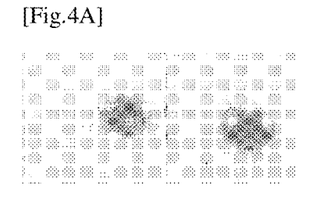
FIGS. 4A and 4B are photographs illustrating the detection of hydrogen sulfide by a fiber web of Example 1 upon treatment with a test gas at 25° C., wherein only the relative humidity of the test gas was varied (about 23% in FIG. 4A, and about 66% in FIG. 4B)
Figure 4B:
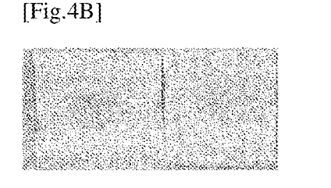

First, a test gas having a hydrogen sulfide concentration of 3 ppm was allowed to flow into the fiber web of Example 1 for one minute at a flow rate of 500 SCCM at 25° C., and the results thereof are illustrated separately as FIGS. 4A and 4B for different relative humidity levels of the test gas, wherein FIG. 4A is for the relative humidity of about 23% and FIG. 4B is for the relative humidity of about 66%.

The results show that the detection ability was changed according to the relative humidity of the test gas, and that a PVDF material is more suitable for the detection of hydrogen sulfide in a dry environment (FIG. 4A) than in a humid environment (FIG. 4B).

Figure 5A:
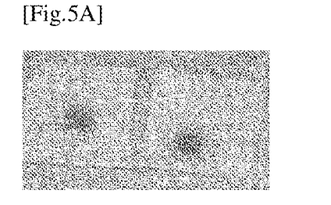
FIGS. 5A and 5B are photographs illustrating the detection of hydrogen sulfide by a fiber web of Example 4 upon treatment with a test gas at 25° C., wherein only the relative humidity of the test gas was varied (about 8.5% in FIG. 5A, and about 66% in FIG. 5B)
Figure 5B:
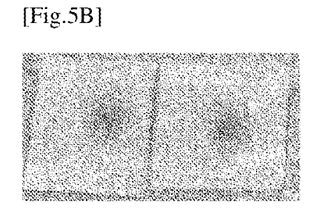

Next, a test gas having a hydrogen sulfide concentration of 3 ppm was allowed to flow into the fiber web of Example 4 for one minute at a flow rate of 500 SCCM at 25° C., and the results thereof are illustrated separately as FIGS. 5A and 5B for different relative humidity levels, wherein FIG. 5A is for the relative humidity of about 8.5% and FIG. 5B is for the relative humidity of about 66%.

The results show that hydrogen sulfide was detected in the test gas in both cases of high relative humidity and low relative humidity, and this indicates that the inclusion of an ionic liquid allowed even a fiber web made of a hydrophobic fiber-forming material to exhibit an excellent ability to detect a target substance in a humid environment.

Next, specimens of varying ionic liquid content were evaluated for the rate of hydrogen sulfide detection at the same relative humidity of a test gas. Specifically, while allowing a test gas having a hydrogen sulfide concentration of 1 ppm and a relative humidity of about 66% to flow into each of the specimen at a flow rate of 500 SCCM at 25° C. using a production jig (manufactured by Amogreentech) illustrated in FIG. 10, the time in seconds required to change the color of the specimen to black or yellowish brown was measured, and the results thereof are shown in Table 2 below.

2. Evaluation of Spinning Ability

SEM images were taken of the specimens of Examples 1, 4 to 9 at 20 kX magnification, and were examined to evaluate the uniformity of nanofibers and find portions of closed pores due to ejection of droplets. In this case, based on the images taken, a specimen including closed pores or at least five beads was evaluated as "x", a specimen free of closed pores and including two to five beads was evaluated as "0", and a specimen including less than two beads was evaluated as

TABLE 2

| | Example 1 | Example 4 | Example 5 | Example 6 | Example 7 | Example 8 | Example 9 |
|---|---|---|---|---|---|---|---|
| Ionic liquid content (parts by weight) | 0 | 2.8 | 0.8 | 1.1 | 2.0 | 3.9 | 4.2 |
| Time required for color change (seconds) | 88 | 35 | 58 | 45 | 42 | 40 | 41 |
| Spinning ability | ◎ | ◎ | ◎ | ◎ | ◎ | ○ | X |

As can be seen from Table 2, the specimens of Examples 4 to 9, in which an ionic liquid was used, are more suitable for the detection of a target substance in the inflow of a humid test gas than the specimen of Example 1, in which an ionic liquid was not used.

Example 10

A fiber web for a gas sensor as shown in Table 3 was prepared in the same manner as in Example 1 except that a spinning solution containing PVP (manufactured by Sigma-Aldrich, molecular weight: 360,000) in an amount of 15 parts by weight with respect to 100 parts by weight of PVDF was used.

Examples 11 to 14

A fiber web for a gas sensor as shown in Table 3 was prepared in the same manner as in Example 10 except that the amount of PVP included in a spinning solution was varied as shown in Table 3.

Experimental Example 3

The following properties of the fiber webs for a gas sensor prepared according to Examples 10 to 14 were evaluated.

1. Evaluation of Ability to Detect Hydrogen Sulfide Gas at Various Humidities

The ability of each specimen to detect hydrogen sulfide gas was evaluated by allowing a test gas of varying hydrogen sulfide concentration and varying relative humidity to flow into the specimen at a predetermined flow rate using a production jig (manufactured by Amogreentech) illustrated in FIG. 10. In this case, the used specimens measured 20 mm (width)×20 mm (length).

Figure 6A:
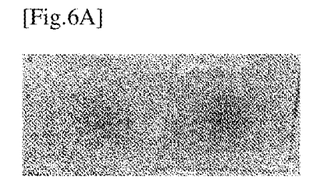
FIGS. 6A and 6B are photographs illustrating the detection of hydrogen sulfide by a fiber web of Example 10 upon treatment with a test gas at 25° C., wherein only the relative humidity of the test gas was varied (about 66% in FIG. 6A, and about 83% in FIG. 6B)
Figure 6B:
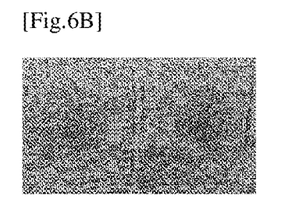

First, a test gas having a hydrogen sulfide concentration of 3 ppm was allowed to flow into the fiber web of Example 10 for one minute at a flow rate of 500 SCCM at 25° C., and the results thereof are illustrated separately as FIGS. 6A and 6B for different relative humidity levels of the test gas, wherein FIG. 6A is for the relative humidity of about 66% and FIG. 6B is for the relative humidity of about 83%.

The results show that hydrogen sulfide was detected with excellent sensitivity even in a test gas with a very high humidity of 66% or more.

Next, specimens of varying PVP content were evaluated for the rate of hydrogen sulfide detection at the same relative humidity of a test gas. Specifically, while allowing a test gas having a hydrogen sulfide concentration of 1 ppm and a relative humidity of about 66% to flow into each of the specimen at a flow rate of 500 SCCM at 25° C. using a production jig (manufactured by Amogreentech) illustrated in FIG. 10, the time in seconds required to change the color of the specimen to black or yellowish brown was measured, and the results thereof are shown in Table 3 below.

2. Evaluation of Spinning Ability

SEM images were taken of the specimens of Examples 1, 10 to 14 at 20 kX magnification, and were examined to evaluate the uniformity of nanofibers and find portions of closed pores due to ejection of droplets. In this case, based on the images taken, a specimen including closed pores or at least five beads was evaluated as "x", a specimen free of closed pores and including two to five beads was evaluated as "○", and a specimen including less than two beads was evaluated as 3. Evaluation of Surface Tackiness After being evaluated for the ability to detect hydrogen sulfide gas at varying humidity, each of the specimens was evaluated for tackiness by means of touching it with a hand, in which case, a specimen not exhibiting stickiness was evaluated as "x", and a specimen exhibiting stickiness was evaluated as "○".

4. SEM Imaging

Figure 11A:
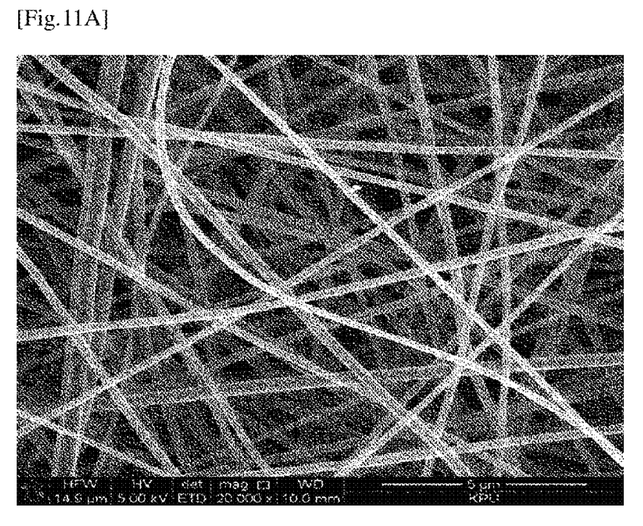
FIGS. 11A and 11B are SEM images of a fiber web of Example 10, taken at different magnifications (20 kX for FIG. 11A, and 100 kX for FIG. 11B).
Figure 11B:
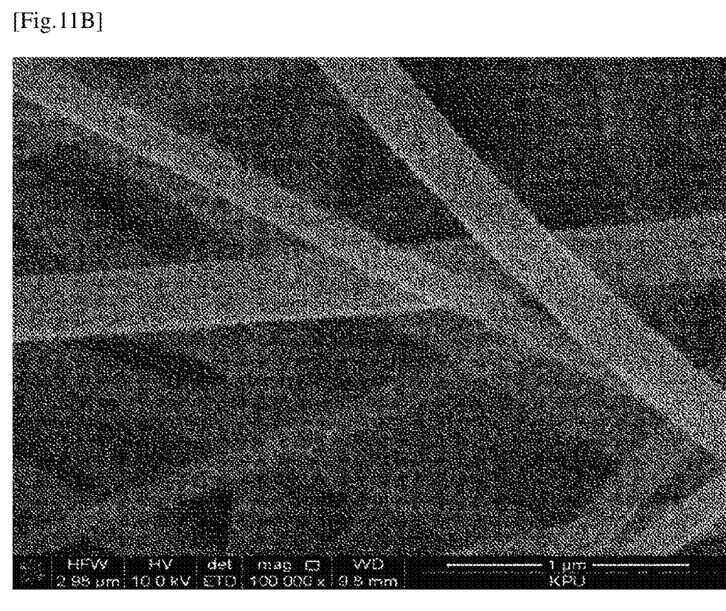

SEM images were taken of the fiber web of Example 10 at 20 kX and 100 kX magnifications, and the results are shown in FIGS. 11A and 11B, respectively.

Specifically, it is determined from FIGS. 11A and 11B that excellent spinning ability was exhibited in the preparation of the fiber web, as indicated by the nanofibers that are highly uniform in diameter and do not include closed pores.

TABLE 3

|  | Example 1 | Example 10 | Example 11 | Example 12 | Example 13 | Example 14 |
|---|---|---|---|---|---|---|
| PVP content (parts by weight) | 0 | 15 | 8.5 | 11.0 | 19.5 | 22.0 |
| Time required for color change (seconds) | 88 | 32 | 47 | 35 | 43 | 50 |
| Spinning ability | ◎ | ◎ | ◎ | ◎ | ◎ | ◎ |
| Surface tackiness | X | X | X | X | X | ○ |

As can be seen from Table 3, the specimens of Examples 11 to 14 including PVP as a fiber-forming material were more suitable for the detection of a target substance in the inflow of a humid test gas than the specimen of Example 1 not including PVP. Meanwhile, compared to Example 13, there was an increase in time required for a color change in Example 14 despite a higher PVP content thereof, and it is considered that this result was attributed to the detachment of the sensing material or the like caused by the increased humidity which induced dissolution of the PVP component.

While the present invention has been particularly shown and described with reference to exemplary embodiments thereof, it is to be understood that the spirit of the invention is not limited to the exemplary embodiments disclosed herein, and that the invention will encompass other embodiments made, through the modification, deletion, or addition of elements, within the scope of the invention and suggested by those skilled in the art.

What is claimed is:

1. A fiber web for a gas sensor, the fiber web comprising nanofibers including:
    fiber portions; and
    a sensing material provided so as to have a first proportion of the sensing material disposed inside of the fiber portions and a second proportion of the sensing material exposed on a surface of the fiber portions so that the second portion is available for a reaction with a target substance contained in a gas,
    wherein the nanofibers have an average diameter ranging from 150 nm to 1 μm, the fiber web has a thickness ranging from 1 μm to 20 μm, and the fiber web has a basis weight ranging from 3 g/cm$^2$ to 30 g/cm$^2$,
    wherein the nanofibers do not include a portion having a diameter of at least 1.5 times the average diameter of the nanofibers,
    wherein the nanofibers contain an ionic liquid in an amount of 1 to 4 parts by weight with respect to 100 parts by weight of a fiber-forming material from which the nanofibers are formed,
    wherein the amount of the sensing material exposed on the surface of the fiber portions is 5 parts by weight to 20 parts by weight with respect to 100 parts by weight of the fiber portions, and
    wherein the fiber portions comprise polyvinylidene fluoride (PVDF).

2. The fiber web of claim 1, wherein the target substance is hydrogen sulfide, and the sensing material includes one or more of lead acetate and a hydrate thereof.

3. The fiber web of claim 1, wherein the fiber portions further contain polyvinylpyrrolidone.

4. A gas sensor comprising the fiber web of claim 1.

* * * * *